Patented June 27, 1933

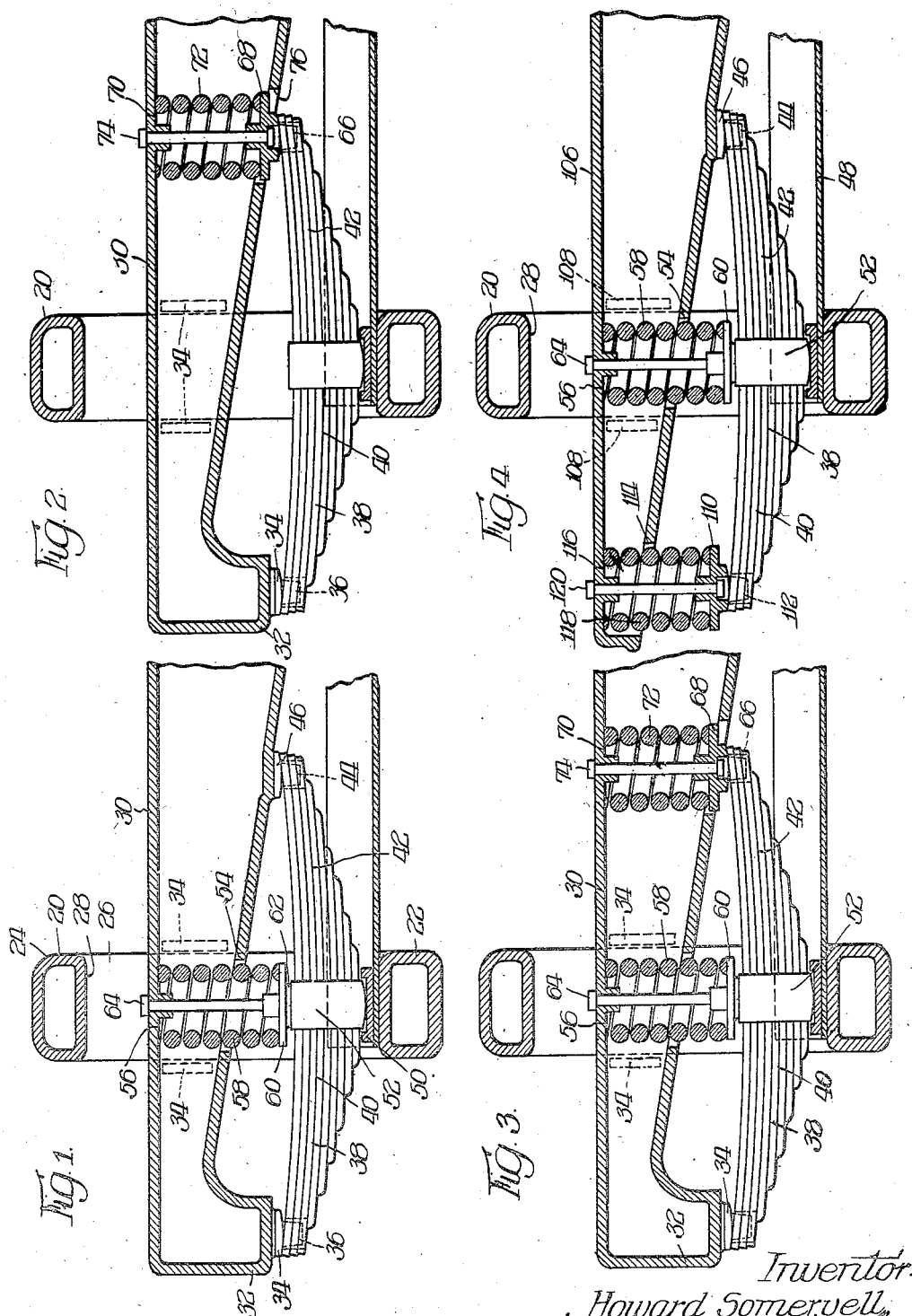

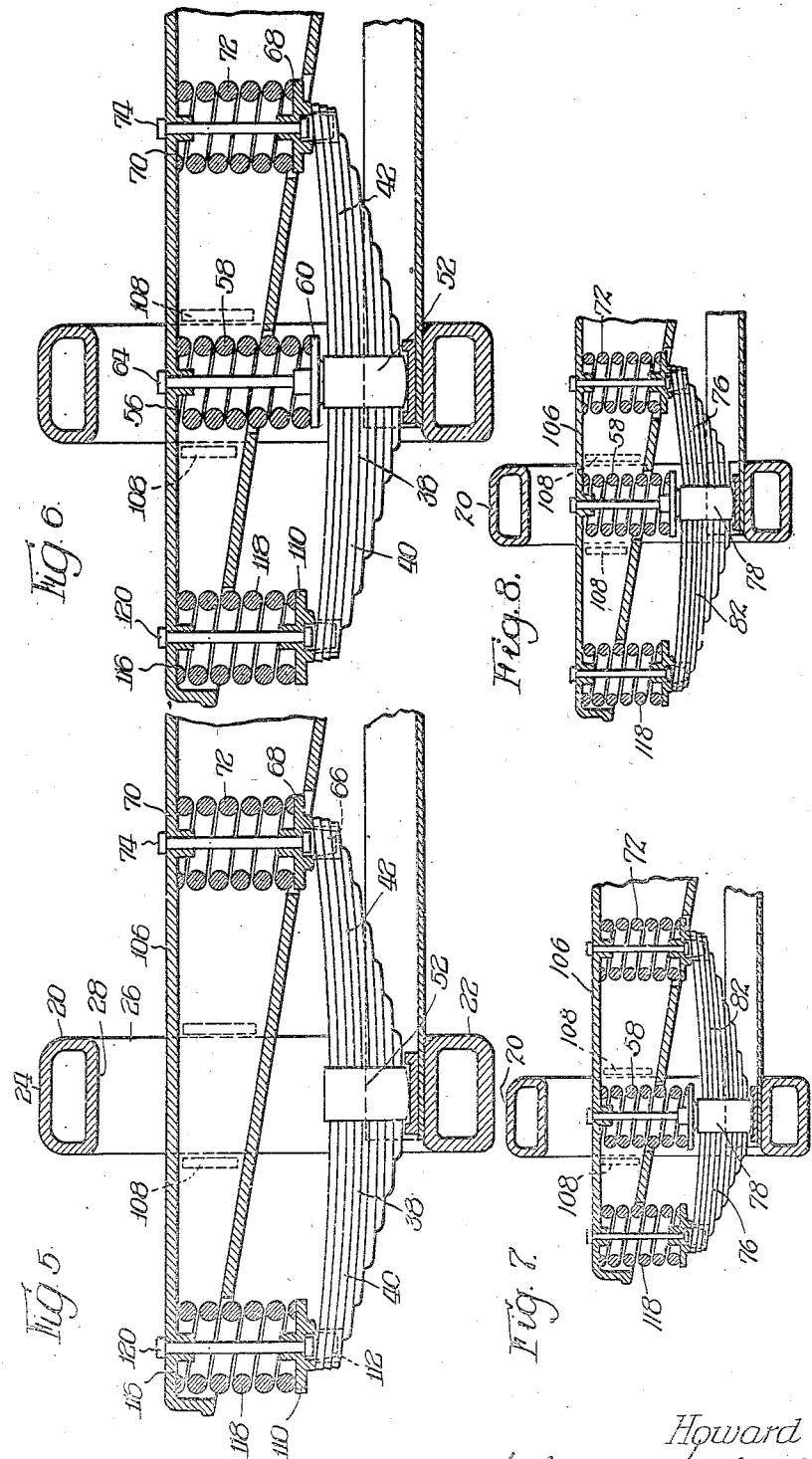

1,916,080

UNITED STATES PATENT OFFICE

HOWARD SOMERVELL, OF EVANSTON, ILLINOIS, ASSIGNOR TO AMERICAN STEEL FOUNDRIES, OF CHICAGO, ILLINOIS, A CORPORATION OF NEW JERSEY

TRUCK

Application filed September 8, 1931. Serial No. 561,535.

This invention pertains to car trucks.

Desirable features for freight car trucks are economy, simplicity, lightness, strength and ease of maintenance, and these features are generally obtained within practical limitations on freight trucks now in use. However, present freight car trucks are very deficient in easy riding qualities since the spring suspension usually consists only of coil springs which strike a natural period of oscillation or vibration at some operating speed of the car. The resulting motion imparted to truck parts, car body and lading is violent and destructive and results in much damage to lading. Track or wheel irregularities, even if very slight, will set up this oscillation and when the frequency with which these irregularities are passed over agrees with the vibration period of the springs the motion amplifies and continues, due to the lack of dampening qualities in coil springs. The motion may amplify to the extent of causing derailment of the truck.

Efforts have been made to improve this condition by the use of frictional devices with the coil springs for the purpose of dampening the motion, but unless considerable friction is obtained they are not effective enough and if sufficient friction is obtained the spring action becomes too stiff and lacks sensitivity.

Passenger car trucks are generally easy riding, due to the use of both coil and elliptic leaf springs in series; the coil springs responding to the light, quick shocks, the leaf springs to the slow, heavy impulses. Coil springs are quick and sensitive in response, leaf springs relatively less so, partly due to frictional work absorption between the leaves. For this reason, and also by providing coil and leaf springs of different natural vibration periods, they tend to dampen each other's synchronous vibration without impairing free spring response. This condition is obtained by having the different springs in series. Placing leaf and coil springs in parallel is not sufficient, since they then act as a unit and have a common period of vibration.

Although the usual passenger car truck with series arrangement of coil and leaf springs gives good riding qualities, it is undesirably heavy, costly and complicated for freight service. This is partly due to the complete duplication of carrying capacity in both coil and leaf springs.

It is therefore an object of this invention to provide a car truck which provides good riding qualities, and at the same time is economical to make and maintain, is simple and light in construction, and fulfills all requirements of manufacture and service.

Another object of the invention is to provide a car truck wherein the spring suspension is such that springs of different character are placed in series.

Yet another object of the invention is to provide a car truck having springs of different characteristics in series and so disposed that complete duplication of carrying capacity is not required in both kinds of springs.

A further object of the invention is to provide a car truck having springs of different character which are adapted to work independently of each other whereby shocks incident to operation are adequately absorbed.

A still further object of the invention is to provide a car truck wherein the springs are arranged so that each dampens out the other's vibration.

A yet further object is to provide a truck construction wherein resilient pads are provided for dampening out metallic vibrations transmitted through the metallic truck parts, and also for the purpose of deadening noises.

Another further object is to provide a truck construction wherein resilient and friction and/or resilient means are disposed in series.

A different object is to provide spring assemblies wherein there is provided softer cushioning action under light loads, while at the same time providing the necessary stiffness and capacity under heavy loads, these features being combined also to provide a construction which reduces any tendency toward synchronous vibration of the springs.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figures 1 to 8 inclusive are transverse fragmentary sectional elevations of modified forms of the truck embodying the invention.

Referring first of all more particularly to Figures 1, 2 and 3, it will be understood that the side frame 20 is of the conventional truss construction including the tension member 22, the compression member 24, and the spaced column guides 26 forming the bolster opening 28. The tension and compression members merge adjacent their ends and are provided with any form of journal box cooperating with any preferred form of wheel and axle assembly (not shown). The bolster 30 is provided with the usual center and side bearings (not shown) and extends through the bolster opening 28, being provided with the depending seat portion 32 and the spaced column guide cooperating members 34.

The seat portion 32 is provided with the seat member 34 having a depending dowel 36 received in a suitable aperture formed in the outer leg 38 of the leaf spring assembly 40. The inner leg 42 of the spring assembly is of equal length to the outer leg and is apertured to receive the dowel 44 of the seat member 46 also provided on the bolster. The side frames are squared and connected by means of the spring plank 48 provided with the seat member 50 disposed substantially on the longitudinal center line of the side frame and rockably receiving the spring band 52 of the semi-elliptic spring assembly 40.

In the modification illustrated in Figure 1 the lower web of the bolster is apertured as at 54, and the upper web of the bolster is provided with the spring seat 56. The coil spring assembly 58 is seated on the spring seat 56 and on the spring seat 60 seated on the spring band and positioned thereon by means of the dowel 62. The bolt 64 is also provided for positioning the spring assembly. In such construction the coil spring axis is disposed substantially on the longitudinal center line of the side frames.

In the construction illustrated in Figure 2 the outer leg 38 of the spring assembly 40 is seated on the seat member 34 and positioned by means of the dowel 36. The inner leg 42, however, is adapted to receive the dowel 66 of the spring seat 68. The bolster 30 is provided with the inner spring seat 70 instead of the spring seat 56, and the coil spring assembly 72 is disposed between the spring seats 68 and 70, and the positioning bolt 74 is also provided for positioning the assembly. The lower member of the web of the bolster is apertured as at 76 for the reception of the coil spring assembly 72.

In the construction shown in Figure 3 the outer leg 38 is seated on the member 34, and the spring band 52 is provided with the seat member 60. The coil spring assembly 58 is seated on the seat 56 and provided with bolts 64. The inner leg 42 is provided with the seat member 68, the coil spring assembly 72 seating on the seat 70, the positioning bolt 74 also being provided.

It will also be understood that in any of the figures coil springs of constant pitch and constant section may be used, or springs of variable pitch, or springs of variable stiffness, or any spring such as shown in application Serial No. 552,153, Hedgcock, filed July 21, 1931.

Referring now more particularly to the construction shown in Figures 4, 5, 6, 7 and 8, the side frame 20 is similar to that already described, being provided with the bolster opening 28, the side frames being connected by the spring plank 40. The bolster 106 extends through the bolster opening and is provided with the guide cooperating member 108.

In the construction shown in Figure 4 the leaf spring 38 is of equal leg construction, and is provided at its outer end with the spring seat 110 having the positioning dowel 112 received in a suitable aperture in the outer leg 40. The bolster is provided with a suitable aperture 114 in the lower web thereof and is provided in the upper web thereof with the spring seat 116, and the coil spring assembly 118 is disposed between the coil spring 116 and the spring seat 110, and the positioning bolt 120 is also provided. The lower web of the bolster is also apertured at 54 for the reception of the spring 58 seated on the seat 60 positioned on the spring band 52, the coil spring 58 also seating on the seat 56, and a positioning bolt 64 being provided. The inner end of the leaf spring is seated on the seat 46 provided on the bolster, the positioning dowel 44 being received in a suitable aperture in the inner leg 42 of the leaf spring assembly.

In the construction shown in Figure 5 the leaf spring 38 is provided with the spring seat 110 seated on the outer leg and positioned thereon by means of the dowel 112. The coil spring assembly 118 is seated on said seat and on the seat 116 of the bolster 106. The inner leg 42 of the leaf spring assembly is provided with the spring seat 68 positioned thereon by means of the dowel 66 and the coil spring assembly 72 is seated thereon and on the seat 70 provided on the bolster, the positioning bolt 74 being also provided.

In the construction shown in Figure 6 coil spring assemblies 118, 58 and 72 are provided extending through suitable apertures in the bolster and seating on the seats 116, 56 and 70, and also seated on the seats 110, 60 and 68, positioning bolts 120, 64 and 74 being provided. The spring seats 110, 60 and 68 seat in a manner as has already been described on the outer leg 40, the spring band 52, and the inner leg 42 of the semi-elliptic spring assembly 38.

In the constructions shown in Figures 7 and 8 the coil spring assemblies 118, 58 and 72, the respective seats on the bolster 106 as well as the lower spring seats, are similar to those already described. In these modifications, however, the spring band 78 is provided with a semi-elliptic leaf spring assembly similar to that described in Figures 7 and 8.

In Figure 7 the short leg 76 is provided outwardly and the long leg 82 extends inwardly. In Figure 8 the unbalanced leaf spring is reversed. In the constructions shown in Figures 9 and 10, the side frame 20 is provided with the bolster opening 28 and is similar in construction to the side frame already described. The bolster 122 extends through the bolster opening and is provided with members 124 slidably embracing the column guides 26. The spring plank 126 extends into the bolster opening and connects the spaced side frames, the spring plank being provided with the seat members 128 and 130 having the upwardly extending dowels 132 and 133 received in suitable apertures provided in the leaf spring assembly 134. In the construction shown, the leaf spring assembly is of the equal leg type, though it is understood that it may be of the unequal leg type. The spring band 136 is provided with the spring seat 138 positioned thereon by means of the dowel 140. The bolster is suitably apertured as at 142, and the coil spring assembly 144 is seated on the spring seat assembly 138 and extends through the opening 142, and is seated on the spring seat 146 provided on the upper member of the bolster, the positioning bolt 148 being also provided.

In the construction wherein the coil springs are disposed at the ends of the leaf springs, they operate in series, one to dampen the vibration of the other and to take shocks of different character. Where the springs are disposed with the spring band they operate in parallel with the leaf springs, and of course where they are provided at the spring band and not at the ends they operate in series and in parallel. Where leaf springs are used having unbalanced legs, the spring itself is designed to frictionally and resiliently react to shocks of different character, one leg serving to dampen the vibration of the other. It may also be said that the leaf springs act as resilient equalizers, the leaf springs also being friction means, and in modifications such as shown in Figures 1 to 8 inclusive, the leaf spring may be replaced by a solid equalizer performing that function. It will thus be appreciated with the constructions shown that easy riding as well as inexpensive truck construction is provided.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

What is claimed is:

1. In a truck, the combination of a side frame having spaced tension and compression members and connecting spaced column guides forming a bolster opening, a bolster extending through said opening and slidably cooperating with said guides, a semi-elliptic spring supporting said bolster at a plurality of points and carried by said tension member between said guides, and a coil spring disposed between said first named spring and bolster substantially in the plane of said side frame.

2. In a truck, the combination of a side frame having spaced tension and compression members and connecting spaced column guides forming a bolster opening, a bolster extending through said opening and slidably cooperating with said guides, a leaf spring supporting said bolster at a plurality of points and carried by said tension member between said guides, and a metallic spring disposed between said first named spring and bolster substantially in the plane of said side frame.

3. In a truck, the combination of a side frame having spaced tension and compression members and connecting spaced column guides forming a bolster opening, a bolster extending through said opening and slidably cooperating with said guides, a semi-elliptic spring supporting said bolster at a plurality of points and carried by said tension member between said guides, and a coil spring disposed between said first named spring and bolster inwardly of said side frame.

4. In a truck, the combination of a side frame having spaced tension and compression members and connecting spaced column guides forming a bolster opening, a bolster extending through said opening and slidably cooperating with said guides, a leaf spring supporting said bolster at a plurality of points and carried by said tension member between said guides, and a metallic spring disposed between said first named spring and bolster inwardly of said side frame.

5. In a truck, the combination of a side frame having spaced tension and compression members and connecting spaced column guides forming a bolster opening, a bolster extending through said opening and slidably cooperating with said guides, a semi-elliptic spring supporting said bolster at a plurality of points and carried by said tension member between said guides, and a coil spring disposed between said first named spring and bolster inwardly of said side frame and at the inner end of said semi-elliptic spring.

6. In a truck, the combination of a side frame having spaced tension and compression members and connecting spaced column guides forming a bolster opening, a bolster extending through said opening and slidably cooperating with said guides, a semi-elliptic spring supporting said bolster at a plurality of points and carried by said tension member between said guides, a coil spring disposed between said first named spring and bolster inwardly of said side frame and at the inner end of said semi-elliptic spring, and a coil spring disposed between said first named spring and bolster substantially in the plane of said side frame.

7. In a truck, the combination of a side frame having spaced tension and compression members and connecting spaced column guides forming a bolster opening, a bolster extending through said opening and slidably cooperating with said guides, a leaf spring supporting said bolster at a plurality of points and carried by said tension member between said guides, a coil spring disposed between said first named spring and bolster substantially in the plane of said side frame, and a coil spring disposed between one end of said leaf spring and said bolster.

8. In a truck, the combination of a side frame having spaced tension and compression members and connecting spaced column guides forming a bolster opening, a bolster extending through said opening and slidably cooperating with said guides, a leaf spring supporting said bolster at a plurality of points and carried by said tension member between said guides, a coil spring disposed between said first named spring and bolster substantially in the plane of said side frame, and a coil spring disposed between each end of said leaf spring and said bolster.

9. In a truck, the combination of a side frame having spaced tension and compression members and connecting spaced column guides forming a bolster opening, a bolster extending through said opening and slidably cooperating with said guides, a leaf spring supporting said bolster at a plurality of points and carried by said tension member between said guides, a coil spring disposed between said first named spring and bolster substantially in the plane of said side frame, and a coil spring disposed between the outer end of said leaf spring and said bolster.

10. In a truck, the combination of a side frame having spaced tension and compression members and connecting spaced column guides forming a bolster opening, a bolster extending through said opening and slidably cooperating with said guides, a semi-elliptic spring supporting said bolster at a plurality of points and carried by said tension member between said guides, and a coil spring disposed between said first named spring and bolster at each end of said semi-elliptic spring.

11. In a truck, the combination of a side frame having spaced tension and compression members and connecting spaced column guides forming a bolster opening, a bolster extending through said opening and slidably cooperating with said guides, a semi-elliptic spring supporting said blofter at a plurality of points and carried by said tension member between said guides, a metallic spring disposed between said first named spring and bolster at each end of said semi-elliptic spring, and a metallic spring disposed between said first named spring and bolster substantially in the plane of said side frame.

12. In a truck, the combination of a side frame, a bolster, a leaf spring supporting said bolster at a plurality of points and carried by said side frame, and resilient means disposed between said leaf spring and bolster substantially in the plane of said side frame.

13. In a truck, the combination of a side frame, a bolster, a leaf spring supporting said bolster at a plurality of points and carried by said side frame, and a metallic spring disposed between said leaf spring and bolster inwardly of said side frame.

14. In a truck, the combination of a side frame, a bolster, a leaf spring supporting said bolster at a plurality of points and carried by said side frame, resilient means disposed between said leaf spring and bolster substantially in the plane of said side frame, and additional resilient means disposed between said leaf spring and bolster inwardly of said side frame.

15. In a truck, the combination of a side frame, a bolster, a leaf spring supporting said bolster at a plurality of points and carried by said side frame, resilient means disposed between said leaf spring and bolster substantially in the plane of said side frame, and additional resilient means disposed between said leaf spring and bolster outwardly of said side frame.

16. In a truck, the combination of a side frame, a bolster, a leaf spring supporting said bolster at its ends and carried by said side frame, and a metallic spring disposed between each end of said leaf spring and bolster.

17. In a truck, the combination of a side frame, a bolster, a leaf spring supporting said bolster at its ends and carried by said side frame intermediate its ends, resilient means disposed between each end of said leaf spring and bolster, and additional resilient means disposed between said leaf spring and bolster substantially in the plane of said side frame.

18. In a truck, the combination of a side frame, a bolster, a leaf spring disposed parallel to said bolster and supporting said bolster at a plurality of points, said leaf spring being carried by said side frame, and a metallic spring disposed between said leaf spring and bolster inwardly of said side frame.

19. In a truck, the combination of a side frame, a load carrying member having means thereon cooperating with said side frame whereby said load carrying member is guided therebetween, said load carrying member extending outwardly of said side frame, and a spring assembly supporting said load carrying member on said side frame, said spring assembly including a semi-elliptic leaf spring supported on said side frame at a point and supporting said load carrying member at a plurality of points, one of said points being outwardly of said side frame and the other of said points being inwardly of said side frame, and coil springs disposed in parallel and series with said leaf spring and in supporting relation with said load carrying member.

20. In a truck, the combination of a side frame, a load carrying member having means thereon cooperating with said side frame whereby said load carrying member is guided thereby, said load carrying member extending outwardly of said side frame, and a spring assembly supporting said load carrying member on said side frame, said spring assembly including a semi-elliptic leaf spring supported on said side frame at a point and engaging said load carrying member at a plurality of points, one of said points being outwardly of said side frame and the other of said points being inwardly of said side frame, and a coil spring interposed between said side frame and load carrying member substantially in the plane of said side frame.

21. In a truck, the combination of a side frame, a load carrying member having means thereon cooperating with said side frame whereby said load carrying member is guided thereby, said load carrying member extending outwardly of said side frame, and a spring assembly supporting said load carrying member on said side frame, said spring assembly including a semi-elliptic leaf spring supported on said side frame at a point and supporting said load carrying member at a plurality of points, one of said points being outwardly of said side frame and the other of said points being inwardly of said side frame, and a coil spring interposed between said leaf spring and said load carrying member at the inner of said points.

22. In a truck, the combination of a side frame, a load carrying member having means thereon cooperating with said side frame whereby said load carrying member is guided thereby, said load carrying member extending outwardly of said side frame, and a spring assembly supporting said load carrying member on said side frame, said spring assembly including a semi-elliptic leaf spring supported on said side frame at a point and supporting said load carrying member at a plurality of points, one of said points being outwardly of said side frame and the other of said points being inwardly of said side frame, a coil spring interposed between said leaf spring and load carrying member at the outer of said points, and a coil spring interposed between said load carrying member and said side frame substantially in the plane of said side frame.

23. In a car truck, the combination of a side frame, a bolster having tension and compression members and integral connecting side members forming substantially a box-section, said bolster extending outwardly of said side frame and being provided with a depending spring seat, a spring seat on said bolster inwardly of said side frame and in substantial horizontal alignment with said first named spring seat, a semi-elliptic leaf spring supported on said side frame intermediate the ends of said spring and having legs engaging said spring seats, and a metallic spring interposed between said side frame and bolster compression member and engaging said compression member.

24. In a car truck, the combination of a side frame, a bolster having tension and compression members and integral connecting side members forming substantially a box section, said bolster extending outwardly of said side frame and being provided with a depending spring seat, a spring seat on said bolster inwardly of said side frame and in substantial horizontal alignment with said first named spring seat, a semi-elliptic leaf spring supported on said side frame intermediate the ends of said spring and having legs engaging said spring seats, and a coil spring interposed between said leaf spring and bolster compression member and engaging said compression member.

25. In a car truck, the combination of a side frame, a bolster having tension and compression members and integral connecting side members forming substantially a box section, said bolster extending outwardly of said side frame, a semi-elliptic leaf spring supported on said side frame intermediate the ends of said spring and non-resiliently supporting said bolster inwardly of said side frame, and coil springs interposed between said leaf spring and bolster and engaging said bolster compression member.

26. In a car truck, the combination of a side frame, a bolster having tension and compression members and integral connecting side members forming substantially a box-section, said bolster extending outwardly of said side frame, a semi-elliptic leaf spring supported on said side frame intermediate the ends of said spring and non-resiliently supporting said bolster inwardly of said side frame, and coil springs interposed between said leaf spring and bolster and engaging said bolster compression member, one of said coil springs being disposed in the plane of said side frame.

27. In a car truck, the combination of a side frame, a bolster having tension and compression members and integral connecting side members forming substantially a box-section, said bolster extending outwardly of said side frame, a semi-elliptic leaf spring supported on said side frame intermediate the ends of said spring and non-resiliently supporting said bolster inwardly of said side frame, and coil springs interposed between said leaf spring and bolster and engaging said bolster compression member, one of said coil springs being disposed outwardly of said side frame.

28. In a car truck, the combination of a side frame, a bolster having tension and compression members and integral connecting side members forming substantially a box-section, said bolster extending outwardly of said side frame, a semi-elliptic leaf spring supported on said side frame intermediate the ends of said spring and non-resiliently supporting said bolster inwardly of said side frame, and coil springs interposed between said leaf spring and bolster and engaging said bolster compression member, one of said coil springs being disposed outwardly of said side frame and the other of said coil springs being disposed in the plane of said side frame.

29. In a truck, the combination of a side frame, a bolster having means thereon cooperating with said side frame whereby said bolster is guided therebetween, said bolster extending outwardly of said side frame, and a spring assembly supporting said bolster on said side frame, said spring assembly including a semi-elliptic leaf spring supported on said side frame at a point and supporting said bolster at a plurality of points, one of said points being outwardly of said side frame and the other of said points being inwardly of said side frame, and the coil springs disposed in parallel and series with said leaf spring and in supporting relation with said bolster.

30. In a truck, the combination of a side frame, a bolster having means thereon cooperating with said side frame whereby said bolster is guided thereby, said bolster extending outwardly of said side frame, and a spring assembly supporting said bolster on said side frame, said spring assembly including a semi-elliptic leaf spring supported on said side frame at a point and engaging said bolster at a plurality of points, one of said points being outwardly of said side frame and the other of said points being inwardly of said side frame, and a coil spring interposed between said side frame and bolster substantially in the plane of said side frame.

Signed at Chicago, Illinois, this 12th day of August, 1931.

HOWARD SOMERVELL.